United States Patent [19]
Hasegawa

[11] Patent Number: 5,690,036
[45] Date of Patent: Nov. 25, 1997

[54] TABLE PROVIDED WITH A CUP-HOLDING THROUGH-HOLE

[75] Inventor: Akira Hasegawa, Ibaragi, Japan

[73] Assignee: Eifuku Sangyo Co., LTD, Toyko, Japan

[21] Appl. No.: 677,328

[22] Filed: Jul. 2, 1996

[30] Foreign Application Priority Data

Dec. 25, 1995 [JP] Japan ................ HEI7-351011

[51] Int. Cl.[6] ............................................. A47B 23/00
[52] U.S. Cl. .................... 108/25; 248/311.2; 108/44
[58] Field of Search ................ 108/25, 26, 42, 108/44, 47, 45, 46, 48, 134, 135, 43; 297/188.03, 188.14, 188.15, 188.16, 188.17, 188.18; 248/311.2; 220/738

[56] References Cited

U.S. PATENT DOCUMENTS

| | | | |
|---|---|---|---|
| 1,436,405 | 11/1922 | Rockwood | 108/25 X |
| 1,566,982 | 12/1925 | Shee | 248/311.2 X |
| 1,916,202 | 7/1933 | Bubien | 108/25 X |
| 2,422,350 | 6/1947 | Gross | 312/246 X |
| 3,804,031 | 4/1974 | Pitts | 108/44 |
| 3,817,190 | 6/1974 | Evangelista | 108/44 |
| 3,991,961 | 11/1976 | Platzer, Jr. | 248/311.2 X |
| 4,191,350 | 3/1980 | Ormond | 248/311.2 X |
| 5,511,754 | 4/1996 | Johannsen | 248/311.2 |
| 5,535,682 | 7/1996 | Aigeldinger | 108/25 |

*Primary Examiner*—Laurie K. Cranmer
*Assistant Examiner*—Janet M. Wilkins
*Attorney, Agent, or Firm*—Cushman Darby & Cushman IP Group of Pillsbury Madison & Sutro LLP

[57] ABSTRACT

A table provided with a cup-holding through-hole, which comprises a table plate; a through-hole formed in the table plate; a bag having an open top fixed along the periphery of the through-hole; and a bottom member attached to a bottom of the bag for receiving a cup or the like and adapted to be detachably fitted in the cup-holding through-hole.

5 Claims, 8 Drawing Sheets

TABLE PROVIDED WITH A CUP-HOLDING THROUGH-HOLE

BACKGROUND OF THE INVENTION

1. Field of the Invention

This invention relates to a table attached for example to a vehicle seat, desk or bed, and in particular to a table provided with a cup-holding through-hole.

2. Description of Related Art

Figure 1:
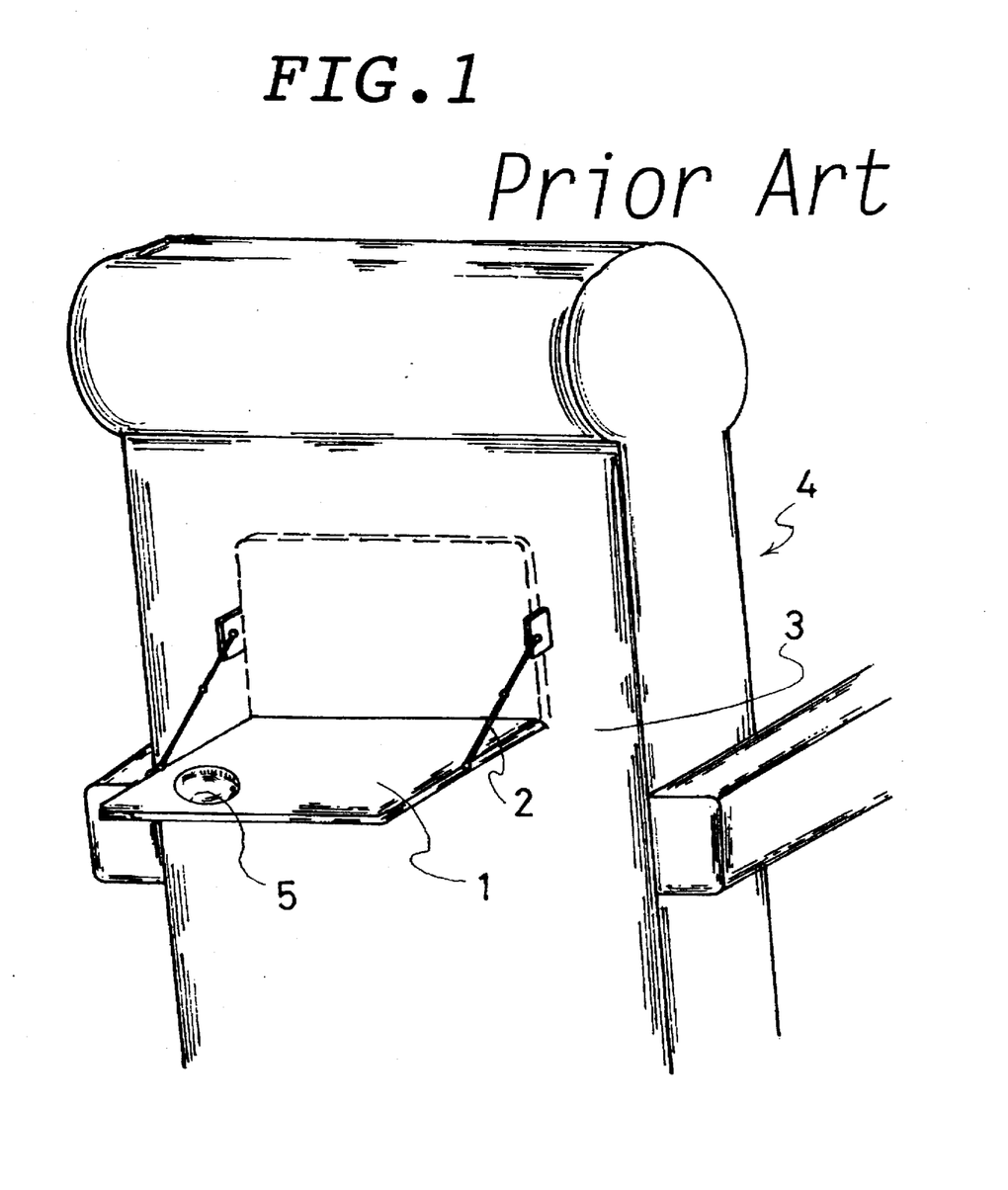
FIG. 1 is a perspective view showing a table for vehicle of the conventional type.

A table provided with a cup-holding through-hole attached to the back of vehicle seat or to any structure near the vehicle seat is conventionally known. For example, as shown in FIG. 1, a table 1 for vehicle is collapsibly attached via a link system 2 to the back 3 of a seat 4 of a vehicle such as a train, an airplane, etc. This table for vehicle 1 is frequently provided with a through-hole 5 for inserting and holding a paper cup therein. Since a paper cup of this type is generally of a reverse frust-conical shape whose diameter is gradually expanding upward, a middle portion of the paper cup can be held by the through-hole 5 when the paper cup is inserted into the through-hole 5. Namely, since the diameter of the through-hole 5 is suitably adjusted in advance to conform with the diameter of the paper cup of specific size, i.e., only a paper cup of specific size can be applicable thereto. Therefore, if a paper cup is of a size smaller than this specific size, the cup may be sunk in the through-hole 5 too deeply to easily take it out, or otherwise, the cup may be passed through the through-hole 5 and dropped without being sustained by the through-hole 5 at all.

Moreover, such a cup-holding through-hole 5 can not be applied to sustain a cylindrical food container having no tapered wall such as a canned beer or juice.

There is also known a table for vehicle provided on the surface thereof with a circular depression for receiving a cup or a container of other kinds therein. However, this circular depression is defective in that it is incapable of securely holding a cup or container, or it may invite an increase in weight of the table.

SUMMARY OF THE INVENTION

Accordingly, an object of the present invention is to provide a table provided with a cup-holding through-hole which is capable of securely sustaining a cup of various size or even a canned food such as a canned beer or juice.

Another object of this invention is to provide a table provided with a cup-holding through-hole which is advantageous in decreasing the weight of the table.

Namely, according to the present invention, there is provided a table provided with a cup-holding through-hole, which comprises a table plate; a through-hole formed in the table plate; a bag having an open top fixed along the periphery of the through-hole; and a bottom member attached to the bottom of the bag and adapted to be detachably fitted in the cup-holding through-hole.

According to this table for vehicle of the present invention, a cup or a container of other kinds can be introduced into the bag through the through-hole thereby holding the cup or container by way of the bag provided with a bottom member and the through-hole. When the table is not in use, the bottom member can be fitted and stored in the through-hole.

2

DESCRIPTION OF THE PREFERRED EMBODIMENT

This invention will be explained further with reference to FIGS. 2 to 11 showing various embodiments of a table for vehicle of the present invention.

First Embodiment

FIGS. 2 to 4B illustrate a first embodiment of a table for vehicle of the present invention wherein the table for vehicle comprises a table plate 12 and a cup-holding device 11. This cup-holding device 11 comprises a through-hole 13 formed in the table plate 12, a net 14 formed into a shape of bag having an open top fixed along the periphery of the through-hole 13 and a bottom extending below the table plate 12, and a bottom member 15 mounted at the bottom of the bag and detachably fitted in the through-hole 13.

Figure 2:
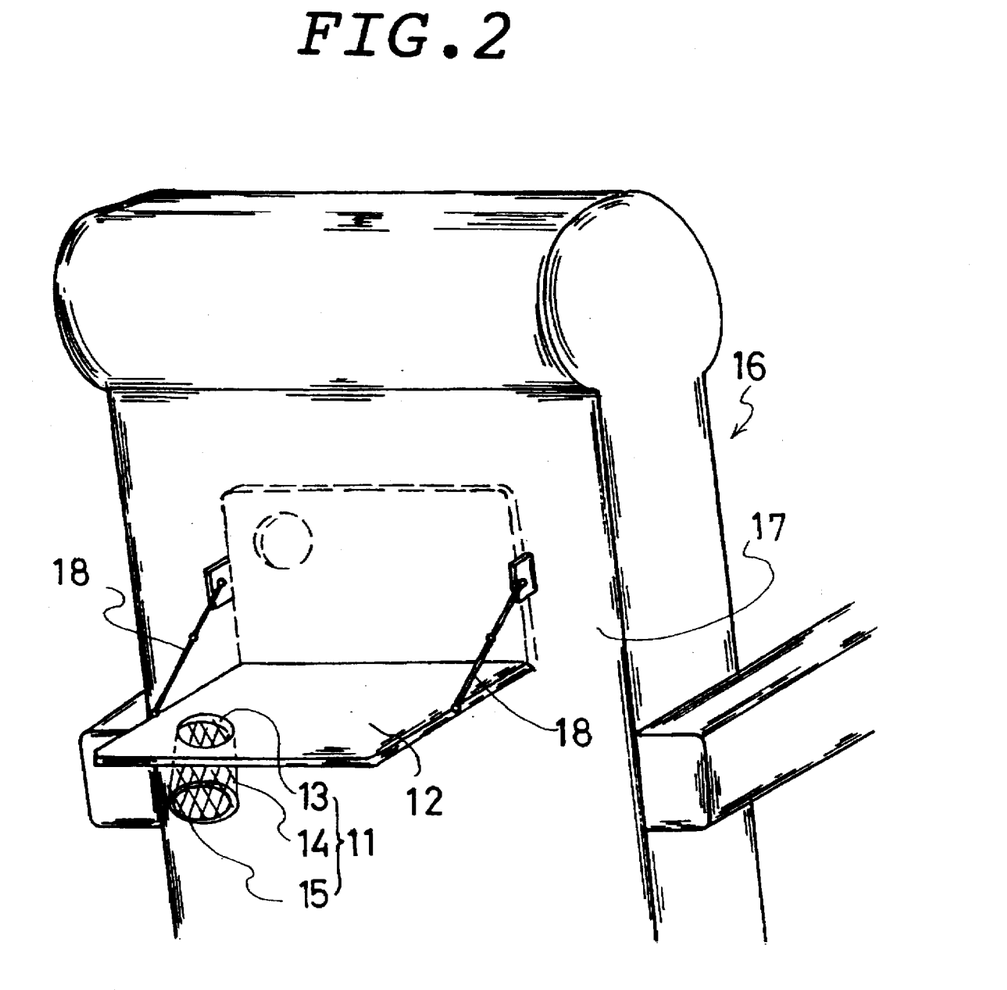
FIG. 2 is a perspective view showing a table for vehicle of the present invention.

The table plate 12 is of small size and attached in this embodiment to the back 17 of the seat 16 of a vehicle such as an air-plane, train, etc. Namely, the table plate 12 of this type is usually hinged to the back 17 of the seat 16 and adapted to be opened through a pair of linking mechanism 18 to allow the table plate to take a horizontal posture or to be closed contacting closely with back surface of the seat as indicated by a dotted line.

Figure 4A:
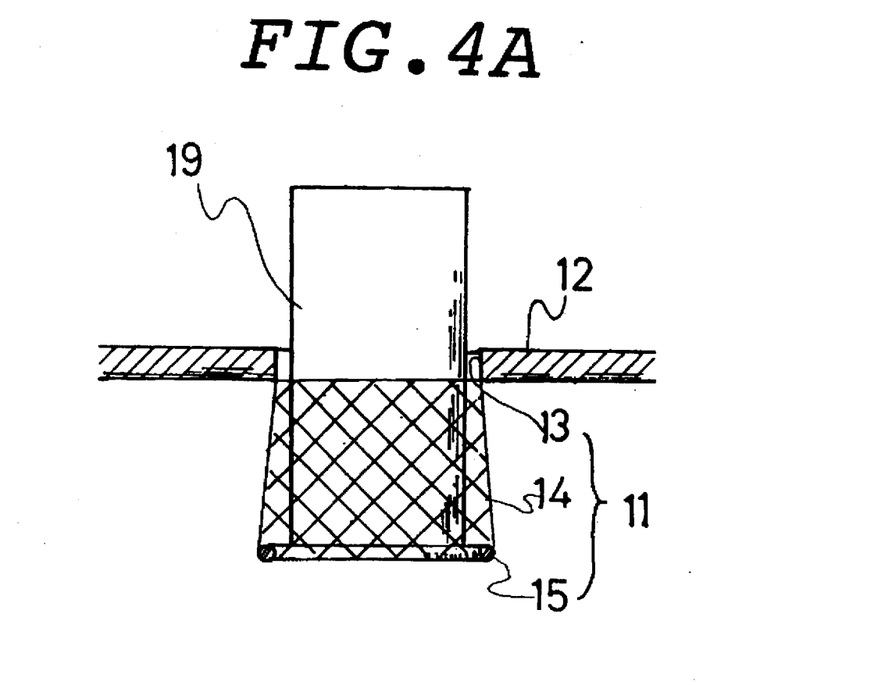
FIG. 4A is a cross-sectional view showing a main portion of a table for vehicle of the present invention where the table for vehicle is in use.

The lower end of the net 14 is closed forming a bag. This net 14 is adapted to receive a container 19 introduced through the through-hole 13 as shown in FIG. 4A so as to prevent the container 19 from being dropped out.

Figure 3:
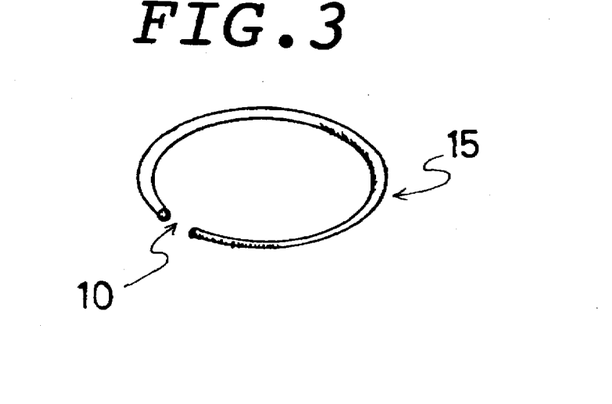
FIG. 3 is a perspective view showing one embodiment of a bottom member of the present invention.

The bottom member 15 in this embodiment is formed of a ring-like spring and sewn on or adhered to along the outer periphery of the bottom of the net 14 as shown in FIG. 3.

This ring-like spring constituting the bottom member 15 has a diameter larger than the diameter of the through-hole 13 and is provided with a slit 10 so that the ring-like spring is allowed to diametrically contract when it is diametrically pressed by hand, the ring-like spring being allowed to restore to its original expanded state due to its resilient force when the pressing force is released. Therefore, the fitting of the bottom member 15 in the through-hole 13 can be realized by first contracting and then inserting the bottom member 15 into the through-hole 13, and then allowing the bottom member 15 to expand to be pressed against the inner wall of the through-hole 13.

The table for vehicle of the present invention constructed as explained above can be employed for holding a container 19 such as cup, bottle or can as explained below. In this explanation, a can having a diameter smaller than that of the through-hole 13 is shown.

First, the table plate 12 is set to a use state or a horizontal state by pulling it down from the back surface 17 of the seat 16 (as shown in a solid line in FIG. 2). Then, the bottom member 15 formed of a ring-like spring is taken out of the through-hole 13, thereby allowing the net 14 to be suspended below the through-hole 13 as shown in FIG. 4A. Under this condition, the container 19 is introduced from the through-hole 13 into the net 14, thus allowing the container 19 to be received by the net 14. Namely, a middle portion of the container 19 is kept sustained by the through-hole 13 and at the same time the bottom portion of the container 19 is kept held by the net 14 and the bottom member 15.

Figure 4B:
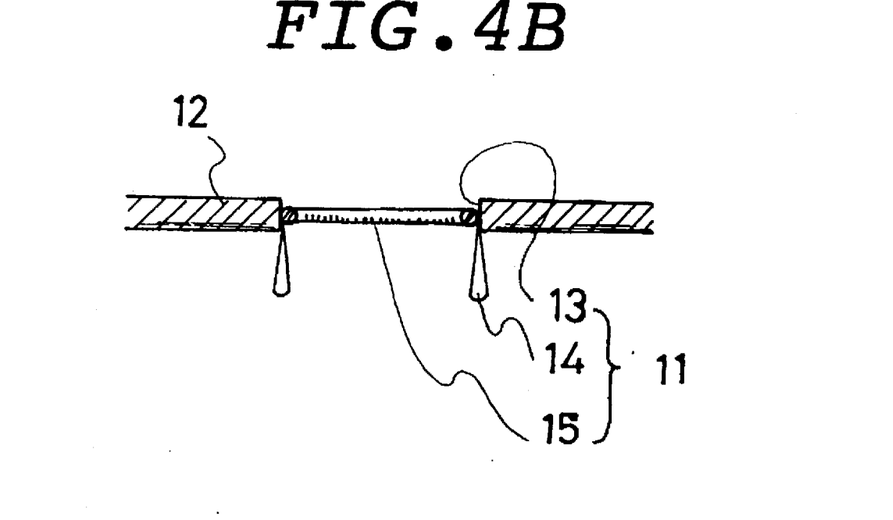
FIG. 4B is a cross-sectional view showing a main portion of a table for vehicle of the present invention where the table for vehicle is not in use.

When the table plate 12 is to be collapsed to turn it back onto the back surface 17 of the seat 16 after use, the bottom member 15 formed of a ring-like spring is diametrically contracted by hand and then fitted in the through-hole 13 while releasing the constricting force of the hand. As a result, the bottom member 15 is allowed to diametrically expand restoring to its original shape and press-contacted onto the inner circumference of the through-hole 13 as shown in FIG. 4B. In this case, the net 14 is folded and stored in the through-hole 13. Thus, since the bottom member 15 can be stored together with the net 14 in the through-hole 13 in this manner when not in use, the cup-holding device 11 would not become any disturbance to a user.

Moreover, since the cup-holding device 11 is provided with the net 14, various kinds of materials such as confectionery can also be put in the net 14 in addition to containers such as cans, bottles and cups.

Second Embodiment

Figure 5A:
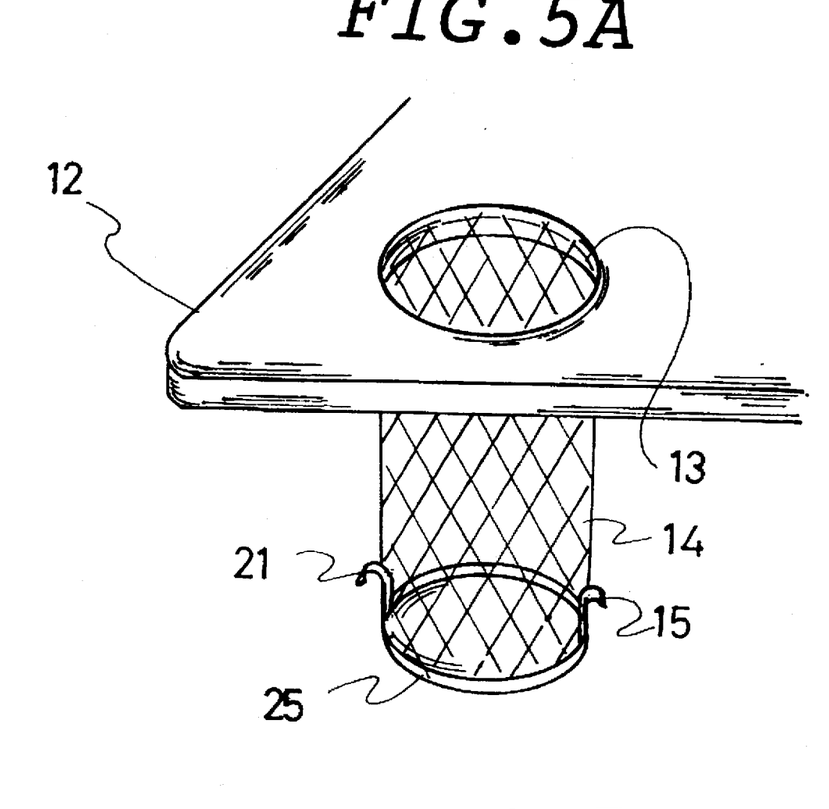
FIG. 5A is a perspective view showing a main portion of a table for vehicle of the present invention where the table for vehicle is in use.
Figure 5B:
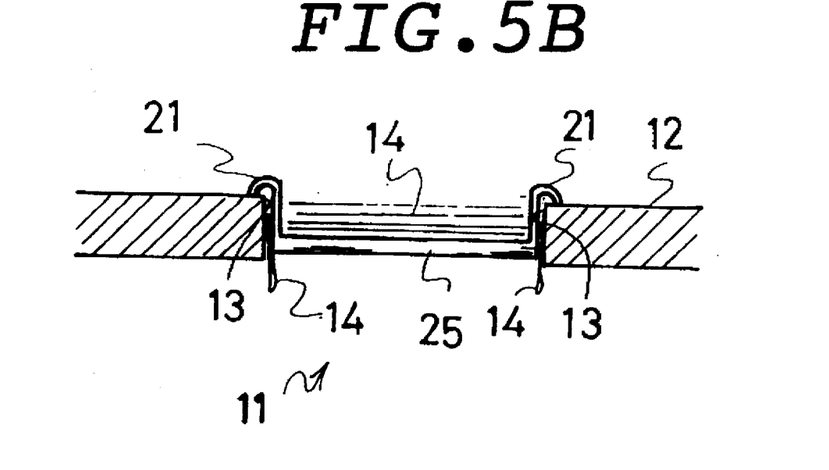
FIG. 5B is a cross-sectional view showing a main portion of a table for vehicle of the present invention where a bottom member is fitted in the through-hole.

FIGS. 5A and 5B illustrate a second embodiment of a table for vehicle of the present invention wherein the cup-holding device 11 comprises a through-hole 13 formed in the table plate 12, a net 14 formed into a shape of bag as in the case of the first embodiment, and a ring-like bottom member 25 mounted at the bottom of the bag and provided at the periphery of the bottom member 15 with a plurality of spring hooks 21 (in the case of the embodiment shown in this drawing, two spring hooks are disposed diametrically opposite to each other). Since this ring-like bottom member 25 is provided with the spring hooks 21, it can be stored or fitted when not in use in the through-hole 13 by hooking the spring hooks 21, i.e. by making use of the elastic action of the spring hooks 21, to the periphery of the through-hole 13 as shown in FIG. 5B. When this table for vehicle is to be used, the spring hooks 21 is disengaged from the through-hole 13 after the table for vehicle is spread to the horizontal state.

Third Embodiment

Figure 6A:
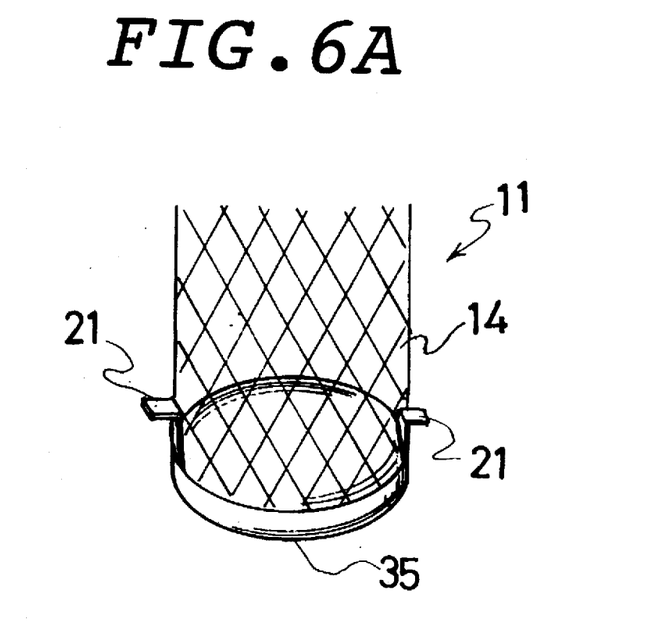
FIG. 6A is a perspective view showing a portion of a bag attached to the table for vehicle of the present invention.
Figure 6B:
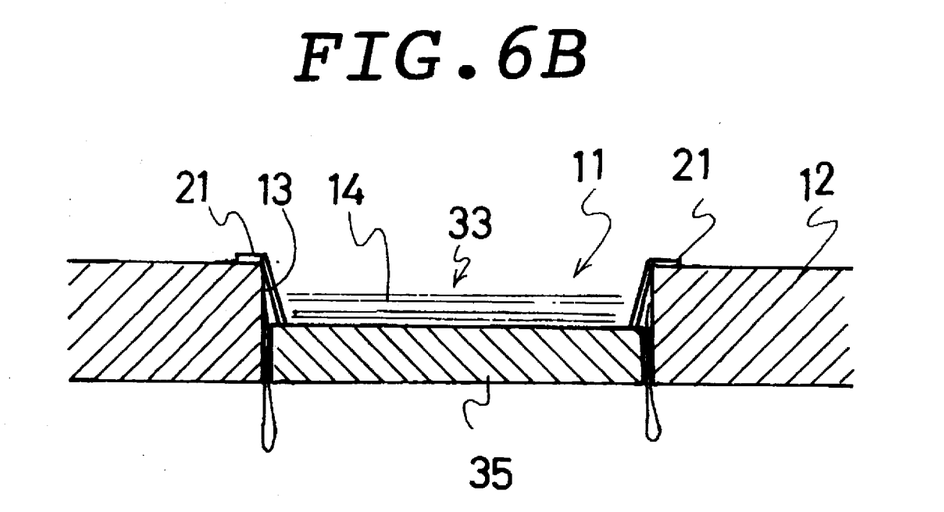
FIG. 6B is a cross-sectional view showing a main portion of a table for vehicle of the present invention where a bottom member is fitted in the through-hole.

FIGS. 6A and 6B illustrate a third embodiment of a table for vehicle of the present invention wherein the cup-holding device 11 comprises a through-hole 13 formed in the table plate 12, a net 14 formed into a cylindrical shape having an open upper end and an open lower end, and a disk-like bottom member 35 mounted at the open lower end thus forming a closed bottom and provided at the periphery of the disk-like bottom member 35 with a plurality of spring hooks 21 (in the case of the embodiment shown in this drawing, two spring hooks disposed diametrically opposite to each other). Since this disk-like bottom member 35 is provided with the spring hooks 21, it can be stored or fitted when not in use in the through-hole 13 as in the case of the second embodiment by hooking the spring hooks 21, i.e. by making use of the elastic action of the spring hooks 21, to the periphery of the through-hole 13 as shown in FIG. 6B.

The diameter of the disk-like bottom member 35 is so designed that the disk-like bottom member 35 can be fitted in the through-hole 13 formed in the table plate 12. Therefore, as shown in FIG. 6B, when the spring hooks 21 is hooked to the periphery of the through-hole 13, the disk-like bottom member 35 is just fitted in the through-hole 13. Furthermore, the thickness of the disk-like bottom member 35 is made thinner than the thickness of the table plate 12 so as to form a circular depression 33 at the portion of the table plate 12 where the through-hole 13 is formed when the disk-like bottom member 35 is fitted in the through-hole 13 as shown in FIG. 6B. This circular depression 33 can be used for placing a beverage container or other material. In this third embodiment, the thickness of the disk-like bottom member 35 is made thinner than the thickness of the table plate 12 as explained above. However, it is of course possible to make the thickness of the disk-like bottom member 35 equivalent to that of the table plate 12 in this invention.

When this table for vehicle is to be used, the spring hooks 21 is disengaged from the through-hole 13 after the table for vehicle is spread to the horizontal state.

Fourth Embodiment

Figure 7A:
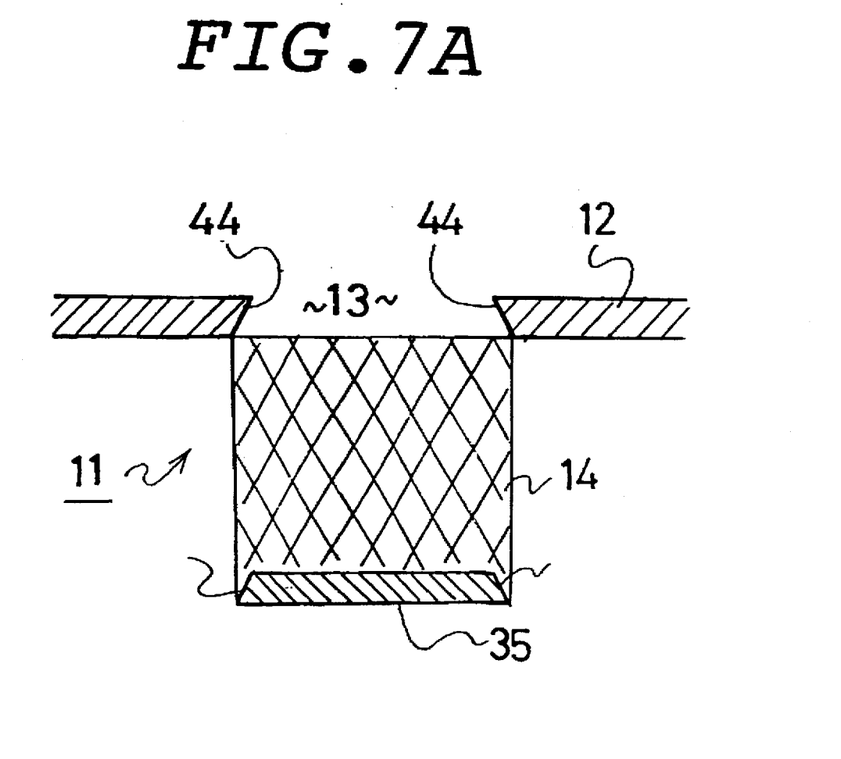
FIG. 7A is a perspective view showing a main portion of a table for vehicle of the present invention where the table for vehicle is in use.
Figure 7B:
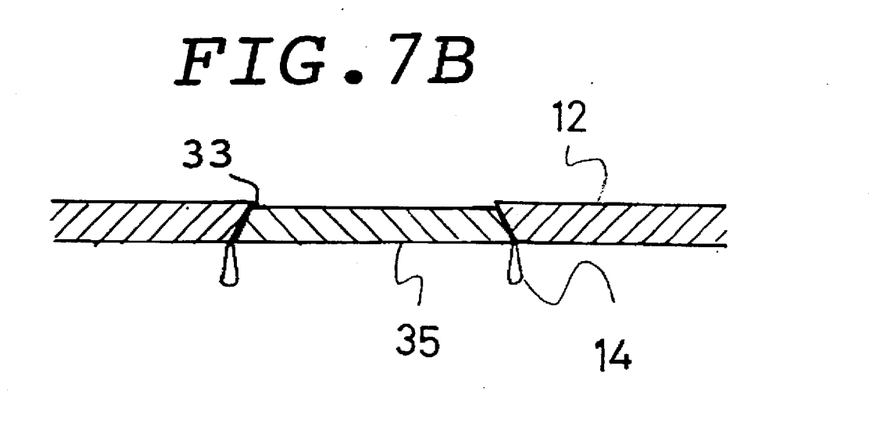
FIG. 7B is a cross-sectional view showing a main portion of a table for vehicle of the present invention where a bottom member is fitted in the through-hole.

FIGS. 7A and 7B illustrate a fourth embodiment of a table for vehicle according to the present invention wherein the cup-holding device 11 comprises a through-hole 13 formed in the table plate 12, a net 14 formed into a cylindrical shape having an open upper end and an open lower end, and a disk-like bottom member 35 mounted at the open lower end thus forming a closed bottom.

The side wall of this disk-like bottom member 35 and the inner wall of the through-hole 13 are both tapered so as to allow the disk-like bottom member 35 to be fitted in the through-hole 13 from the back side of the table plate 12. Namely, the inner wall 44 of the through-hole 13 is tapered in such a manner that the diameter of the through-hole 13 is gradually expanded toward the back side thereof. On the other hand, the diameter of the disk-like bottom member 35 is likewise gradually expanded toward the back side thereof. This disk-like bottom member 35 constitutes the bottom of the cup-holding device 11. This disk-like bottom member 35 can be stored or fitted when not in use in the through-hole 13, i.e. by making use of the wedge-like effect of the disk-like bottom member 35 as shown in FIG. 7B.

Furthermore, when the thickness of the disk-like bottom member 35 is made thinner than the thickness of the table plate 12, a circular depression 33 may be formed at the portion of the table plate 12 where the through-hole 13 is formed when the disk-like bottom member 35 is fitted in the through-hole 13 as shown in FIG. 7B. This circular depression 33 can be used for placing a beverage container or other material as in the case of the third embodiment of this invention.

When this table for vehicle is to be used, the spring hooks 21 is disengaged from the through-hole 13 after the table for vehicle is spread to the horizontal state.

In the above embodiments, a net is exemplified as a bag for putting a beverage can, a cup or other materials. However, the bag may be formed of a flexible or soft material such as paper, plastic film or cloth in place of the net. Furthermore, the bag may be formed of porous or non-porous material.

Figure 8:
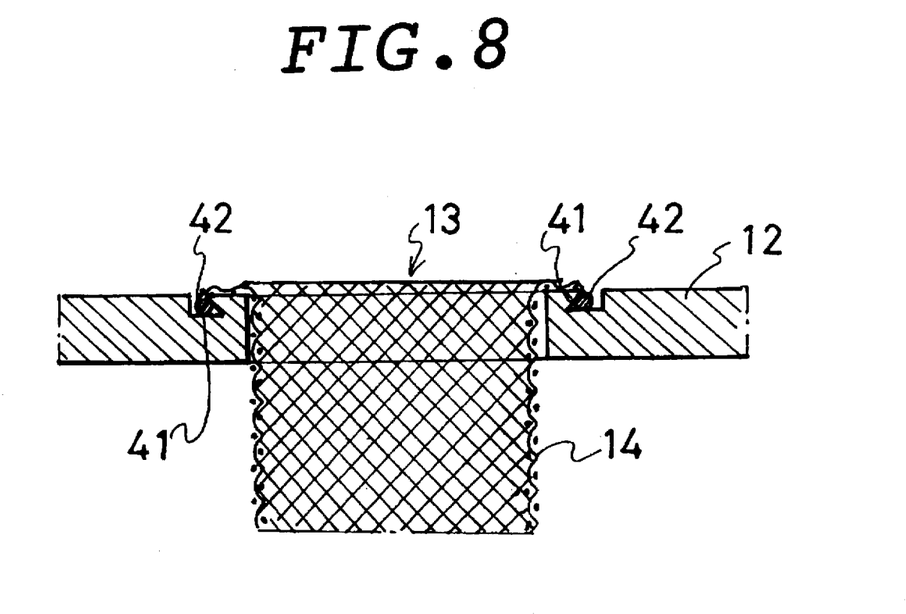
FIG. 8 is a cross-sectional view showing a main portion of a table for vehicle of the present invention which illustrates how to fix a net to the opening of a through-hole.

There is no limitation as to the manner of fixing the net 14 along the periphery of the through-hole 13. FIG. 8 illustrates one example of fixing the net 14 along the periphery of the through-hole 13. According to this example, an annual groove 41 having an enlarged cross-section is formed around the through-hole 13 in the table plate 12. The upper fringe portion of the net 14 is inserted in the annual groove 41 and fixed therein by a fixing means 42 such as a C-shaped spring or a O-shaped rubber ring. Therefore, the net 14 can be detachably fixed in the through-hole 13.

Figure 9:
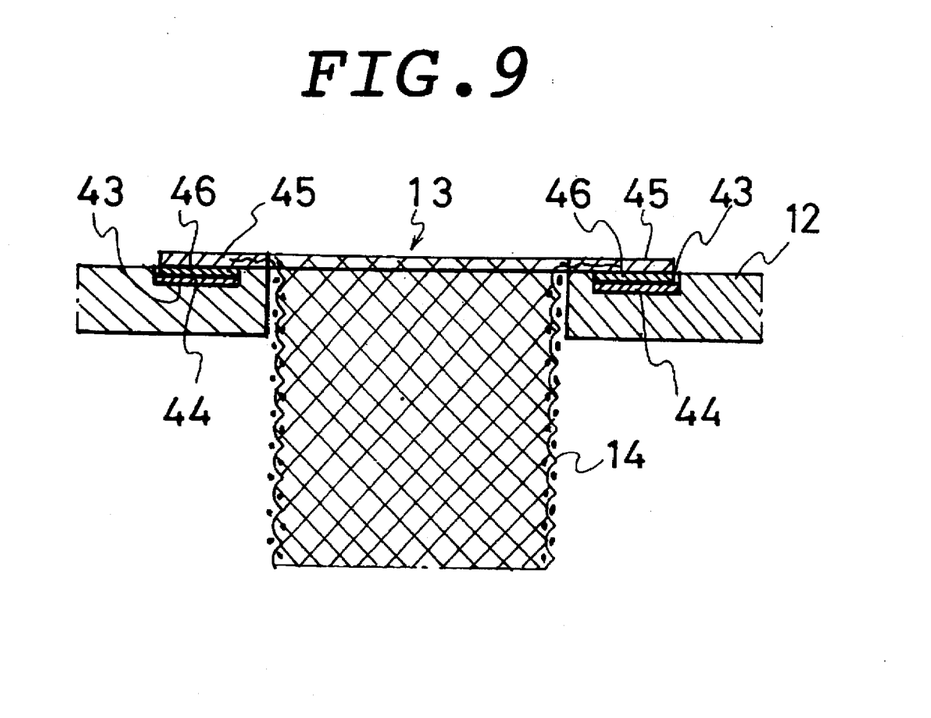
FIG. 9 is a cross-sectional view showing a main portion of a table for vehicle of the present invention which illustrates how to fix a net to the opening of a through-hole.
Figure 10:
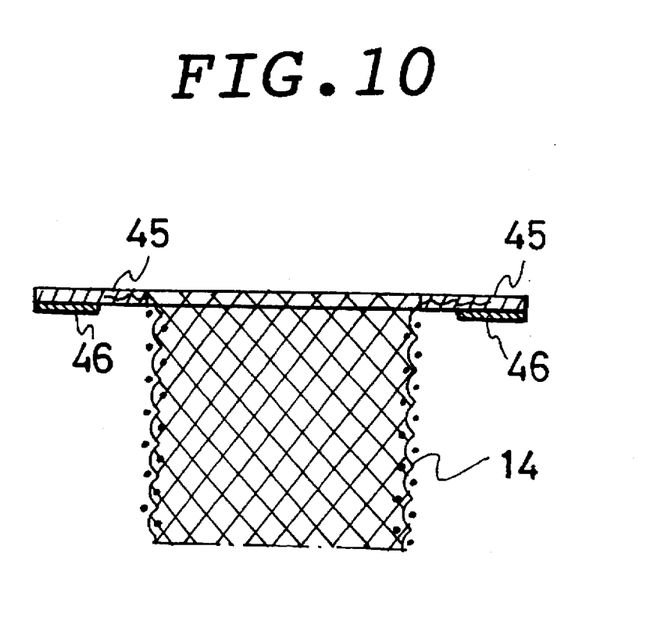
FIG. 10 is a cross-sectional view of the net shown in FIG. 9.

FIG. 9 illustrates another example of fixing the net 14 along the periphery of the through-hole 13. According to this example, a shallow annual groove 43 having a U-shaped cross-section is formed around the through-hole 13, and a female tape fastener 44 is fixed therein. On the other hand, a flange 45 made for example of plastics is formed along the opening of the net 14 and a male tape fastener 46 is attached to the back surface of the flange 45 as shown in FIG. 10. Therefore, the attachment or detachment of the net 14 to the through-hole 13 can be achieved by the engagement or disengagement of the male tape fastener 46 with the female tape fastener 44 as shown in FIG. 9.

Figure 11:
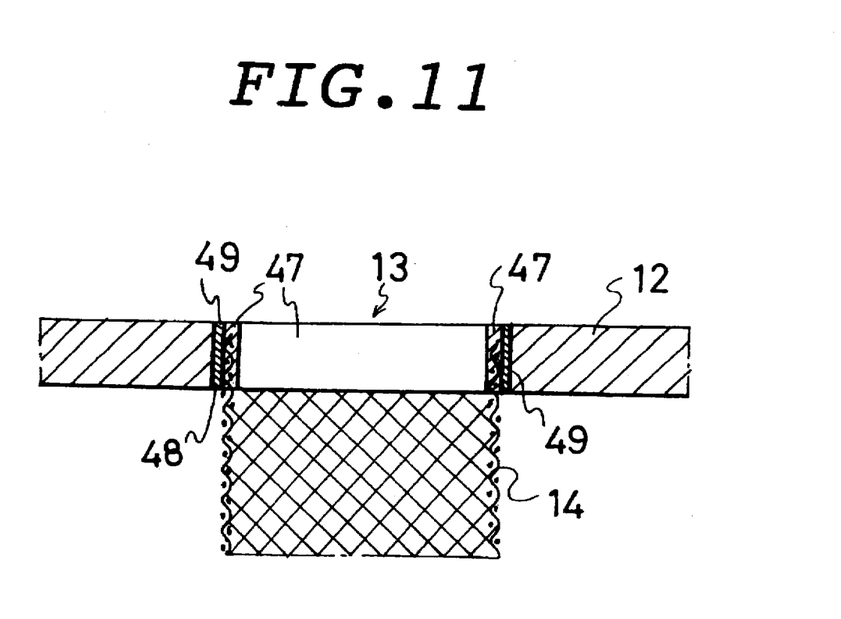
FIG. 11 is a cross-sectional view showing a main portion of a table for vehicle of the present invention which illustrates how to fix a net to the opening of a through-hole.

FIG. 11 illustrates still another example of fixing the net 14 along the periphery of the through-hole 13. According to this example, a collar 47 formed for example of a plastic tape is formed along the opening of the net 14, and therefore, the fixing of the net 14 to the opening of the through-hole 13 is performed by adhering the collar 47 to the inner wall 48 of the through-hole 13 using an adhesive 49. The replacement of the net 14 can be performed by dissolving the adhesive 49.

In the above embodiments, this invention has been explained with reference to the table for vehicle. However this invention is not limited to such, but may be applied to any kinds of table that may be attached to disk, bed or other utensils.

According to the table of this invention, since the cup-holding device comprises a through-hole formed in the table plate and a net 14 formed into a shape of bag for receiving a cup or the like and fixed to the through-hole, it is possible to provide a table which is lighter in weight and has the following features.

Namely, it is possible to securely hold a container or the like with the combination of a through-hole and a net. Therefore, even if the diameter of a cup, a can or other kind container is smaller than the diameter of the through-hole, they can be securely held by the cup-holding device. Since the bottom member can be stored together with the net in the through-hole when not in use, the cup-holding device would not become any disturbance to a user.

If the bottom member is formed of a ring-like spring which is diametrically contractile, the attachment and detachment of the bottom member can be easily performed. Moreover, the bottom member can be cheaply manufactured.

If the bottom member is formed of a ring-like spring provided at the periphery thereof with a plurality of spring hooks, it can be stored or fitted when not in use in the through-hole by hooking the spring hooks to the periphery of the through-hole, so that the attachment and detachment of the bottom member can be easily performed. Moreover, the bottom member can be cheaply manufactured.

When the bottom member is formed of a disk and the thickness thereof is made thinner than the thickness of the table plate so as to form a circular depression at the portion of the table plate where the through-hole is formed when the disk-like bottom member is fitted in the through-hole, this circular depression can be used for placing a beverage container or other material even if the disk-like bottom member is fitted in the through-hole.

When the side wall of this disk-like bottom member and the inner wall of the through-hole are both tapered so as to allow the disk-like bottom member to be fitted in the through-hole from the back side of the table plate, this disk-like bottom member can be stored or fitted when not in use in the through-hole by making the most of the wedge-like effect of the disk-like bottom member. Therefore, the attachment and detachment of the bottom member can be easily performed. Moreover, the bottom member can be cheaply manufactured.

I claim:

1. A table, which comprises a table plate, a through-hole formed in the table plate for cup holding, said though-hole having a periphery, a bag having an open top fixed along the periphery of the through-hole, and a bottom member attached to the bottom of the bag and adapted to be detachably fitted in the through-hole, said bottom member being formed of a ring-like spring which is diametrically contractile.

2. The table according to claim 1, wherein said bag is formed of a net.

3. A table which comprises a table plate, a through-hole formed in the table plate for cup holding, said through-hole having a periphery, a bag having an open top fixed along said periphery of the through-hole, and a bottom member attached to the bottom of the bag and adapted to be detachably fitted in the through-hole, said bottom member being a ring-like member provided with a plurality of spring hooks which can be hooked to said periphery of said through-hole.

4. A table which comprises a table plate having a thickness, a through-hole formed in the table plate for cup holding, said through-hole having a periphery, a bag having an open top fixed along said periphery of the through-hole, and a bottom member attached to the bottom of the bag and adapted to be detachably fitted in the through-hole, said bottom member comprising a disk having a periphery with a plurality of spring hooks which can be hooked to said periphery of said through-hole, said disk being thinner than the thickness of said table plate.

5. A table which comprises a table plate, a through-hole formed in the table plate for cup holding, said through-hole having a periphery, a bag having an open top fixed along said periphery of the through-hole, and a bottom member attached to the bottom of the bag and adapted to be detachably fitted in the through-hole, said through-hole having a tapered inner wall such that the diameter thereof is gradually expanded toward a back side thereof, and said bottom member comprising a disk-like member and being also tapered such that a diameter thereof is gradually expanded toward the back side thereof so that said disk-like bottom member can be stored when not in use in said through-hole.

* * * * *